Figure 1:
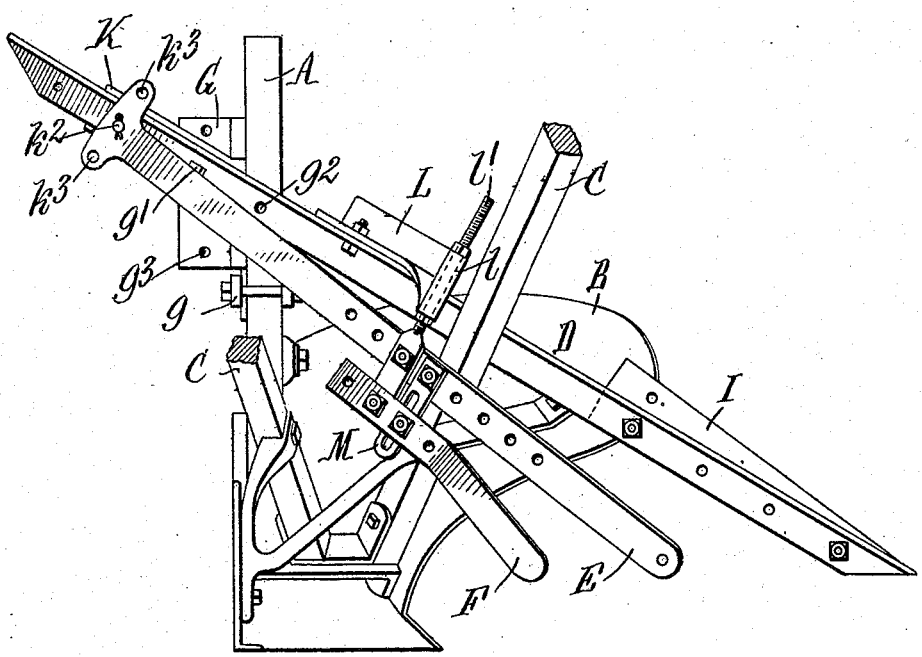

H. M. JACK.
SPREADING ATTACHMENT FOR PLOWS.
APPLICATION FILED JAN. 21, 1909.

941,369.

Patented Nov. 30, 1909.
2 SHEETS—SHEET 1.

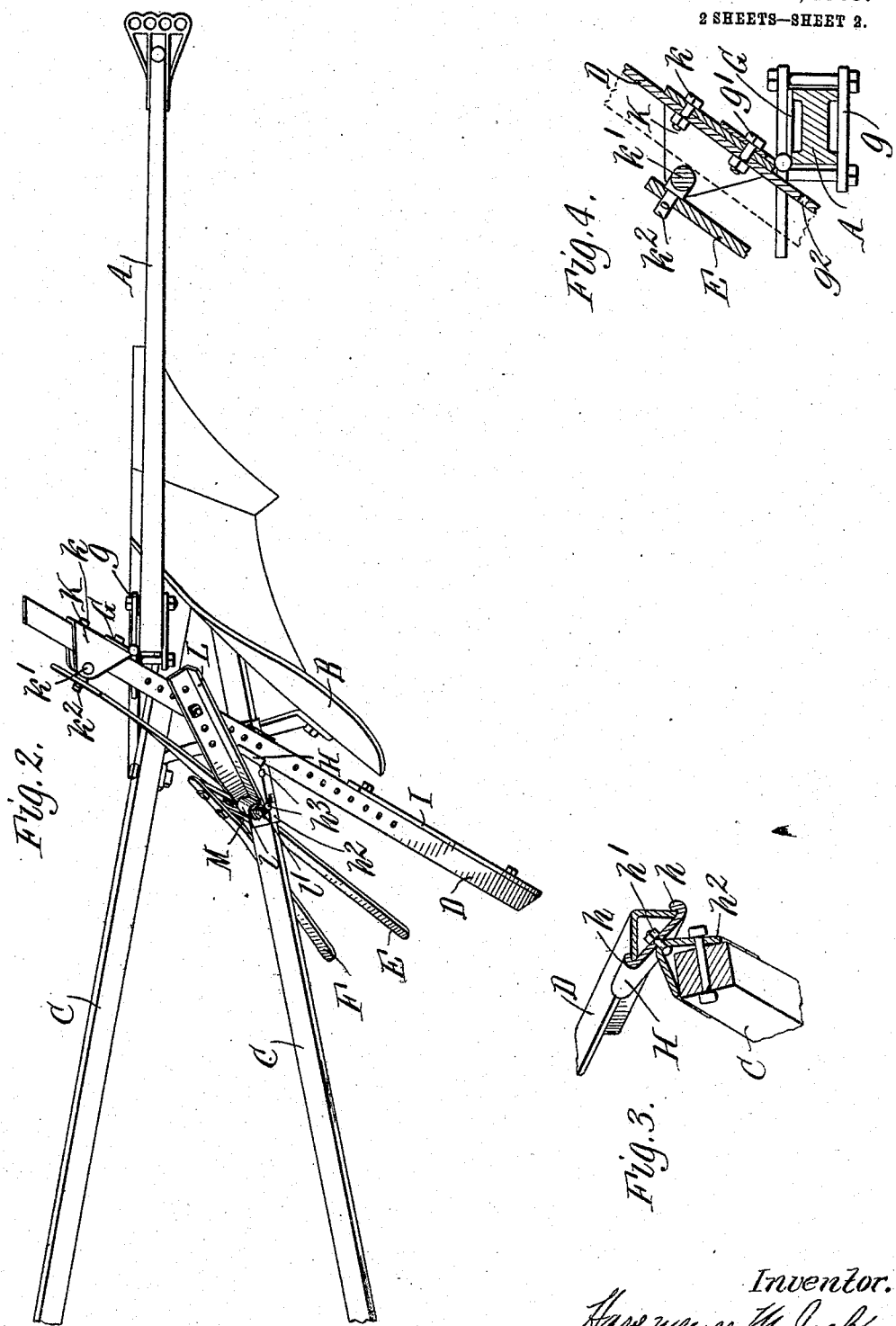

UNITED STATES PATENT OFFICE.

HAVEMEYER M. JACK, OF TUSCARORA INDIAN RESERVATION, NIAGARA COUNTY, NEW YORK.

SPREADING ATTACHMENT FOR PLOWS.

941,369.  Specification of Letters Patent.  Patented Nov. 30, 1909.

Application filed January 21, 1909. Serial No. 473,520.

*To all whom it may concern:*

Be it known that I, HAVEMEYER M. JACK, at present enrolled as a member of the tribe of Onondaga Indians, and a resident of the Tuscarora Indian Reservation, in the county of Niagara, State of New York, have invented a new and useful Improvement in Spreading Attachments for Plows, of which the following is a specification.

This invention relates to improvements in spreading attachments which are applied to plows for breaking up and leveling or spreading the furrow turned over by the plow.

One object of this invention is to provide an attachment for this purpose which is simple and inexpensive in construction and which will operate to effectually break up and spread the furrow without clogging and without unduly increasing the draft of the plow.

A further object of the invention is to provide an attachment of this character which can be readily adjusted in accordance with the depth of the furrow turned by the plow and to spread or level more or less of the furrow, as may be desired.

In the accompanying drawings, consisting of two sheets: Figure 1 is a fragmentary rear elevation of a plow provided with an attachment embodying the invention. Fig. 2 is a plan view of the plow and the attachment on a reduced scale. Fig. 3 is a sectional perspective view, on an enlarged scale, of the means for securing the attachment to the plow handle. Fig. 4 is a section, on an enlarged scale, of the means for securing the attachment to the plow beam.

Like letters of reference refer to like parts in the several figures.

A represents the beam, B the mold board, and C C the handles of a plow of ordinary construction. The spreading attachment is located in the rear part of the plow behind the mold board, being detachably secured to and supported by the beam A and one of the handles C. It comprises a series of spreading arms of different lengths which project obliquely on the furrow side of the plow beyond the outer edge of the mold board, and are arranged one behind the other at different inclinations. The arrangement of these arms is thus such that they successively engage different portions of the furrow turned by the plow and spread the same. The arms are adjustable relative to the plow and to each other to regulate the distance they extend beyond the edge of the mold board and the angles they bear to each other and to the surface of the ground.

In the construction shown, three spreading arms are employed, although a greater number of arms may be used if desired. D, E and F represent respectively the forward, intermediate and rear spreading arms of the attachment.

The forward arm D is located directly behind the mold board B and in front of the handles C C. It is preferably formed of an angle bar and is secured at its inner upper end to the plow beam A by a hinge G, Figs. 2 and 4, one member of which is rigidly secured to the beam A by a clamp $g$ which embraces this beam, and the other member of which is secured to the arm D by a bolt $g'$ or in any other suitable manner. A series of holes $g^2$ for the bolt $g'$ are provided in the arm D so that the latter may be adjusted lengthwise on the hinge to project to different distances beyond the edge of the mold board, and the hinge member to which the arm D is bolted has a series of holes $g^3$ for the bolt $g'$ so that the arm D may be adjusted to different elevations upon the hinge.

Intermediate of its ends, the arm D is adjustably and pivotally secured to that one of the handles C which is farther from the beam, so that it may be raised or lowered and adjusted angularly thereon. Any suitable means may be employed for this purpose. In the construction shown, a guide plate H is provided having inturned lips or flanges $h$ which embrace the edges of the arm D and form guides in which this arm can slide to permit the endwise adjustment thereof. The plate H is swiveled by a bolt $h'$ to an angle plate $h^2$ which is bolted rigidly to the handle C and is provided with a series of holes $h^3$ for the swivel bolt $h$ so that the guide plate H and arm D may be adjusted to different elevations on the handle. When the arm D is adjusted vertically on the handle C it swings on its connection with the hinge G, and when it is adjusted vertically on the hinge G it swings and slides on its connection with the arm D. By this means, this arm may be raised or lowered and is capable of a great variety of angular adjustments relative to the plow, and as the other arms are secured to the arm D, the attachment may be adjusted as a unit to different positions upon the plow.

A spreading plate I may be bolted or otherwise secured to the lower outer end of the arm D for assisting the spreading action of this arm.

The intermediate arm E extends between the handles C C and is adjustably secured to the arm D in such a manner that it can be shifted to different positions endwise of the arm D and also toward and from and angularly relative to said arm. For this purpose any suitable connection may be employed. In the construction shown, a U-shaped clip K straddles the arm D, being preferably secured thereto by a bolt $k$ and by the bolt $g'$ which secures the arm D to the hinge G. In the ends of the clip K is secured a swivel post $k'$ provided with a pivot stud $k^2$ which is adapted to enter one of a series of holes $k^3$ in the end of the arm E and be secured therein by a cotter pin or in any other suitable manner.

A bracket L is adjustably bolted to the arm D and extends rearwardly therefrom, being provided at its rear end with a cylindrical bearing $l$ in which is supported an upright hanger $l'$ having a threaded stem and nuts for adjusting it vertically in said bearing. The lower portion of the hanger $l'$ is bolted to the arm E between its ends, the arm E having a series of bolt holes to permit of its adjustment thereon. By adjusting the hanger $l'$ the arm E may be raised and lowered, and by adjusting the bracket L on the arm D the distance between the arms D and E may be regulated. By this manner of connecting the arms, the arm E may be set nearer to or farther from the arm D and more or less parallel with or at an angle to this arm, and can also be adjusted endwise thereof.

The rear arm F is shorter than the other arms and is bolted or otherwise secured at its inner upper end to the hanger $l'$ and is adjustably bolted to a slotted bracket M which is bolted to the intermediate arm E. The arm F can thus be arranged at different desired angles to the arm E and can also be adjusted lengthwise thereof.

It will thus be seen that the forward arm D alone is secured directly to the plow, while the other arms E and F are secured to each other and to the arm D. It is accordingly only necessary to attach the arm D to the plow for securing the attachment thereto, and this can be quickly and easily done.

The arrangement of the spreading arms is such that they successively engage different portions of the furrow turned by the plow. The forward arm engages the top and farther portion of the furrow, the intermediate arm engages the central portion, and the rear arm engages the portion next to the plow. The furrow is thus thoroughly broken up and spread or leveled by the action of these arms.

The attachment can be adjusted as a unit upon the plow by adjusting the forward arm D as before explained, and the several arms can be adjusted relative to each other as described to regulate the distance to which the arms extend beyond the mold board and their elevation, inclination and relative position so as to best adapt the attachment in accordance with the nature of the work to be performed.

The various securing devices of the attachment and the holes in the different arms are so arranged that the attachment can be reversed for use on a left hand plow when desired.

The attachment is especially adapted for use in digging potatoes, in which case the plow is placed so as to travel slightly at one side of the row of potatoes to turn over the same, and the attachment serves to break up and spread the furrow, leaving the potatoes lying exposed on the surface of the ground where they can be readily gathered. The angular arrangement of the spreading arms, one behind the other, prevents the potato vines from collecting upon these arms and clogging the attachment. The attachment is also capable of a great variety of other uses, such as for leveling the furrow in ditching, and for pulverizing and mulching purposes.

I claim as my invention:

1. A furrow spreading and leveling attachment for plows, comprising a plurality of arms which are secured to the plow and extend in rear of the mold board obliquely to the direction of the furrow and at an inclination to the horizontal, with their ends lying in substantially the same horizontal plane and arranged one in advance of the other and at different distances from the furrow, substantially as set forth.

2. A furrow spreading and leveling attachment for plows, comprising a plurality of arms which are secured to the plow and extend in rear of the mold board obliquely to the direction of the furrow and at an inclination to the horizontal, with their ends lying in substantially the same horizontal plane, said attachment being adjustable as a unit to different positions upon the plow and said arms being separately and independently adjustable relative to each other to different inclinations to the horizontal, substantially as set forth.

3. The combination with the plow, of an attachment comprising a plurality of arms which extend in the rear of the mold board obliquely and at an inclination, means for securing one of said arms to the plow which permit endwise and angular adjustment of said arm upon the plow, the other arms of the attachment being secured to and supported by said arm, substantially as set forth.

4. The combination with the plow, of an attachment comprising a plurality of arms which extend in the rear of the mold board obliquely and at an inclination, means for securing one of said arms to the plow which permit endwise and angular adjustment of said arm upon the plow, and means for connecting the other arms of the attachment to said first mentioned arm which permit endwise and angular adjustment of said arms relative to the said first mentioned arm, substantially as set forth.

5. The combination with the plow, of an attachment comprising a plurality of arms which extend in the rear of the mold board obliquely and at an inclination, means for pivotally connecting one of said arms to the plow, means for changing the elevation of the free end of said arm, and means for securing the other arms to said first mentioned arm and for adjusting them relative to said arm, substantially as set forth.

6. The combination with the plow, of an attachment comprising a plurality of arms which extend in the rear of the mold board obliquely and at an inclination, means for pivotally connecting one of said arms to the plow, means for changing the elevation of the free end of said arm, said arm being also adjustable endwise upon the plow, and means for securing the other arms to said first mentioned arm and for adjusting said other arms angularly and endwise relative to said first mentioned arm, substantially as set forth.

Witness my hand, this 16th day of January, 1909.

HAVEMEYER M. JACK.

Witnesses:
 E. C. HARD,
 C. B. HORNBECK.